US012596924B1

(12) United States Patent
Garg

(10) Patent No.: US 12,596,924 B1
(45) Date of Patent: Apr. 7, 2026

(54) SYSTEM AND METHOD FOR MACHINE-READABLE ELECTRONIC DOCUMENT

(71) Applicant: Eightfold AI Inc., Mountain View, CA (US)

(72) Inventor: Ashutosh Garg, Mountain View, CA (US)

(73) Assignee: Eightfold AI Inc., Santa Clara, CA (US)

( * ) Notice: Subject to any disclaimer, the term of this patent is extended or adjusted under 35 U.S.C. 154(b) by 1056 days.

(21) Appl. No.: 17/202,153

(22) Filed: Mar. 15, 2021

Related U.S. Application Data

(60) Provisional application No. 62/990,350, filed on Mar. 16, 2020.

(51) Int. Cl.
*G06N 3/08* (2023.01)
*G06F 16/93* (2019.01)
*G06N 3/04* (2023.01)

(52) U.S. Cl.
CPC .............. *G06N 3/08* (2013.01); *G06F 16/93* (2019.01); *G06N 3/04* (2013.01)

(58) Field of Classification Search
CPC .......... G06N 3/08; G06N 3/04; G06N 3/0895; G06N 3/09; G06N 3/091; G06N 3/092; G06N 3/094; G06N 3/096; G06N 3/098; G06N 3/0985; G06N 3/0455; G06F 16/93
See application file for complete search history.

(56) References Cited

U.S. PATENT DOCUMENTS

| 8,977,953 | B1 * | 3/2015 | Pierre | G06F 40/289 |
| | | | | 715/201 |
| 11,561,987 | B1 * | 1/2023 | Sager | G06F 16/906 |
| 11,720,741 | B2 * | 8/2023 | Nelson | G06F 40/169 |
| | | | | 715/234 |
| 2007/0260648 | A1 * | 11/2007 | Friesenhahn | G06F 16/93 |
| | | | | 707/999.203 |
| 2016/0350283 | A1 * | 12/2016 | Carus | G06F 40/284 |
| 2020/0151185 | A1 * | 5/2020 | Raczko | G06F 16/9535 |
| 2021/0081601 | A1 * | 3/2021 | Begun | G06F 40/131 |

* cited by examiner

*Primary Examiner* — Mohamed Abou El Seoud
(74) *Attorney, Agent, or Firm* — Zhong Law, LLC

(57) ABSTRACT

A computing system and method for a machine-readable electronic document includes a user interface (UI) to receive user input and one or more processors to use a neural network to analyze the user input and then to generate the machine-readable electronic document based on the analysis. The analysis may include determining, from the user input, data associated with at least one of a structure, semantics, or context of the machine-readable electronic document. The machine-readable electronic document may then be generated based on the determined semantics, structure and/or context data. An application programming interface (API) may be provided for accessing the machine-readable electronic document by software applications. A privilege level associated with each of the software applications may be used to determine a level of access to the machine-readable electronic document. The level of access may determine how much of the structure, semantics, and/or context data is provided to an application.

17 Claims, 6 Drawing Sheets

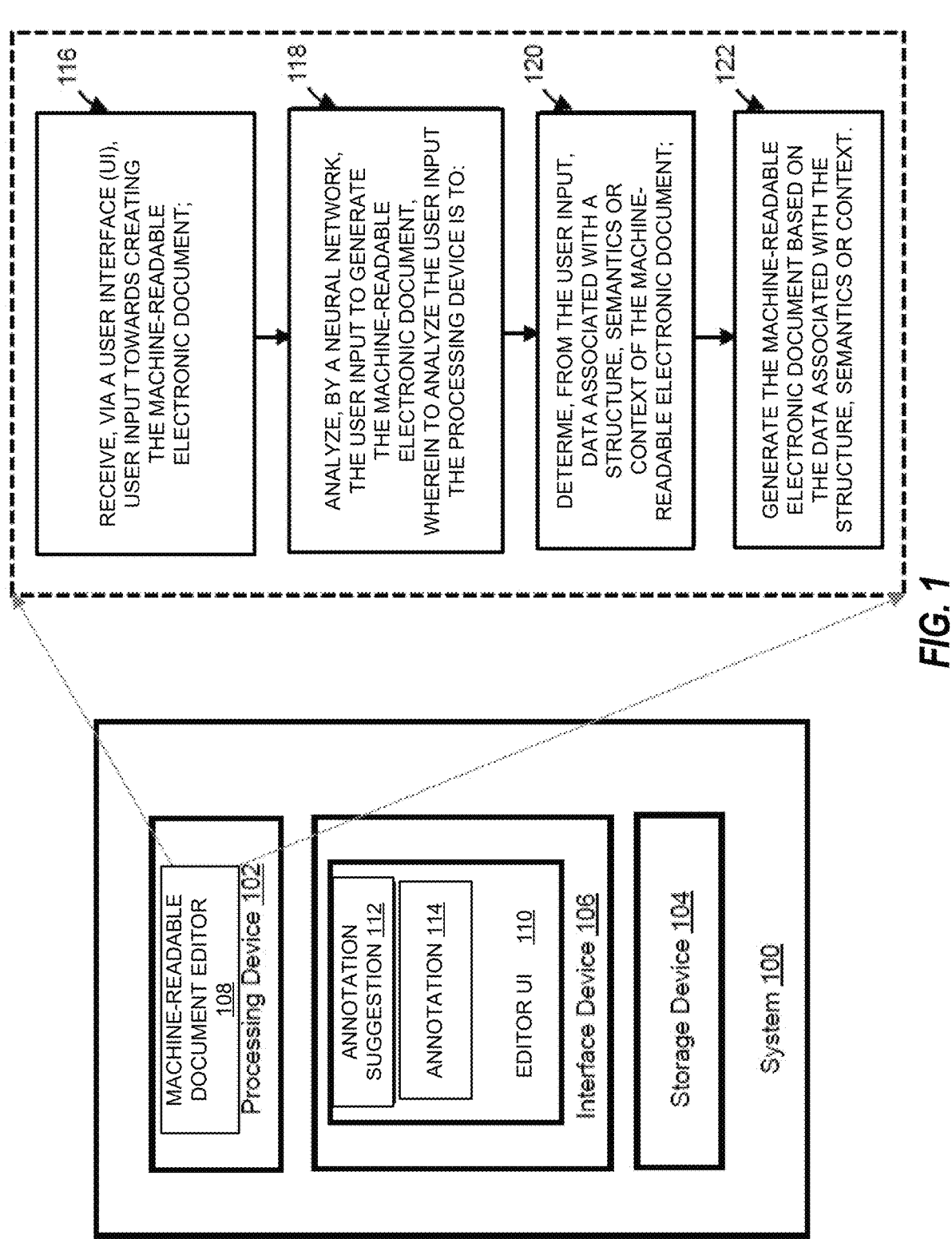

RECEIVE, VIA A USER INTERFACE (UI), USER INPUT TOWARDS CREATING THE MACHINE-READABLE ELECTRONIC DOCUMENT;

118

ANALYZE, BY A NEURAL NETWORK, THE USER INPUT TO GENERATE THE MACHINE-READABLE ELECTRONIC DOCUMENT, WHEREIN TO ANALYZE THE USER INPUT THE PROCESSING DEVICE IS TO:

120

DETERME, FROM THE USER INPUT, DATA ASSOCIATED WITH A STRUCTURE, SEMANTICS OR CONTEXT OF THE MACHINE-READABLE ELECTRONIC DOCUMENT;

122

GENERATE THE MACHINE-READABLE ELECTRONIC DOCUMENT BASED ON THE DATA ASSOCIATED WITH THE STRUCTURE, SEMANTICS OR CONTEXT.

MACHINE-READABLE DOCUMENT EDITOR 108

Processing Device 102

ANNOTATION SUGGESTION 112

ANNOTATION 114

EDITOR UI 110

Interface Device 106

Storage Device 104

System 100

500

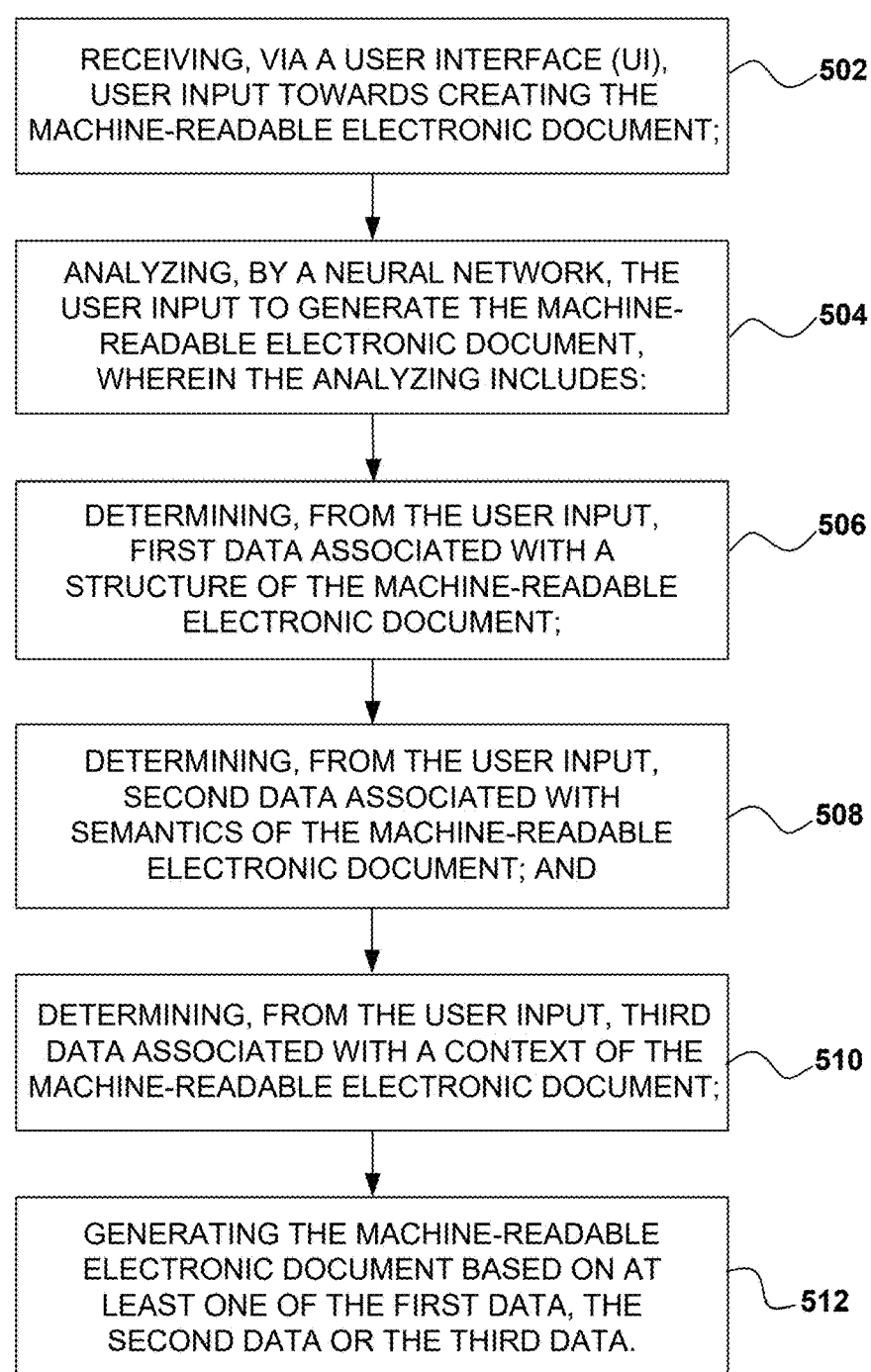

RECEIVING, VIA A USER INTERFACE (UI), USER INPUT TOWARDS CREATING THE MACHINE-READABLE ELECTRONIC DOCUMENT; — 502

ANALYZING, BY A NEURAL NETWORK, THE USER INPUT TO GENERATE THE MACHINE-READABLE ELECTRONIC DOCUMENT, WHEREIN THE ANALYZING INCLUDES: — 504

DETERMINING, FROM THE USER INPUT, FIRST DATA ASSOCIATED WITH A STRUCTURE OF THE MACHINE-READABLE ELECTRONIC DOCUMENT; — 506

DETERMINING, FROM THE USER INPUT, SECOND DATA ASSOCIATED WITH SEMANTICS OF THE MACHINE-READABLE ELECTRONIC DOCUMENT; AND — 508

DETERMINING, FROM THE USER INPUT, THIRD DATA ASSOCIATED WITH A CONTEXT OF THE MACHINE-READABLE ELECTRONIC DOCUMENT; — 510

GENERATING THE MACHINE-READABLE ELECTRONIC DOCUMENT BASED ON AT LEAST ONE OF THE FIRST DATA, THE SECOND DATA OR THE THIRD DATA. — 512

SYSTEM AND METHOD FOR MACHINE-READABLE ELECTRONIC DOCUMENT

CROSS-REFERENCE TO RELATED APPLICATION

This application claims the benefit of and priority to U.S. provisional application Ser. No. 62/990,350, filed on Mar. 16, 2020, the content of which is hereby incorporated by reference in its entirety.

TECHNICAL FIELD

The present disclosure relates to using technical solutions to facilitate the filtering, classifying and ranking of electronic documents, and in particular to a system, method, and storage medium including executable computer programs for using machine learning technologies to implement a machine-readable electronic document.

BACKGROUND

Word processing applications have been used for a very long time by authors to create documents (e.g., textual content) that may be consumed (e.g., read or viewed) by other humans. These applications allow the author of these documents to enter contents (texts or graphics) and concurrently, to organize the content through styling, formatting and visual layouts. The styling, formatting and layout may provide cues for human readers to understand the information in the right context and hierarchy. The wide proliferation of user-generated documents has resulted in many of these documents being initially evaluated by software applications before ever being presented to a human reader for consumption. Instead, these documents are filtered, classified and ranked by software applications before being presented to human readers. Therefore the software applications may have to understand not only the textual content of documents but also information structure and semantics associated with these documents in order to be able to perform more effective filtering, classification and ranking.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates a system for a machine-readable electronic document according to an implementation of the disclosure.

FIG. 5 illustrates a flowchart of a method for a machine-readable electronic document according to an implementation of the disclosure.

FIG. 6 depicts a block diagram of a computer system operating in accordance with one or more aspects of the present disclosure.

DETAILED DESCRIPTION

Figure 2:
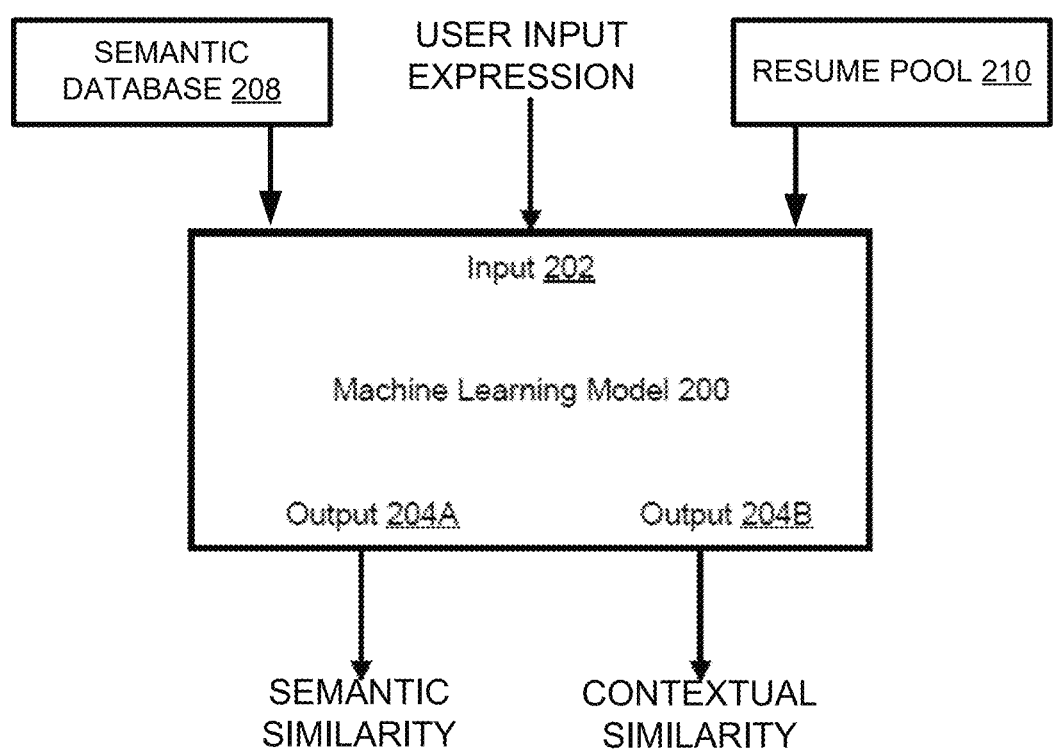
FIG. 2 illustrates a machine learning model according to an implementation of the disclosure.

There is a need for technical solutions that may more effectively facilitate the filtering, classifying and ranking of large quantities of electronic documents by computer software applications. Accordingly, one aspect of the technical solutions presented herein relates to helping the applications accommodate the increasing number of user-generated electronic documents by including machine-readable metadata, about information structure and semantics, to facilitate the filtering, classifying and ranking of the large quantities of electronic documents. The computer applications may then store a ranking of said documents, for presentation to an end user, in the additional machine-readable metadata included in the documents.

Implementations of the disclosure provide technical solutions to address these issues arising from practical applications. Implementations of the disclosure may include an online editor that allows the creation of machine-readable electronic documents. In addition to performing as a simple styling oriented text processing software, the machine-readable electronic document editor may continuously record and/or analyze user inputs based on the semantics, structure and/or context of the input text/images/audio content even while allowing traditional styling.

Based on an author completing the creation of a document, via a user interface (UI), a machine-readable document editor may allow for downloading of documents in a traditional document format (such as .doc or .pdf) with formatting/styling that is appropriate for consumption of the documents by a human reader. Additionally, the machine-readable document editor may also concurrently record and/or analyze the semantics and structure of information associated with the document. Furthermore, the machine-readable document editor may provide a uniform resource locator (URL) and/or a linked quick response (QR) code through which software applications may access the machine-readable documents. Still further, the documents may be protected by security mechanisms to ensure that only consumers (e.g., software applications) authorized by the creator of the machine-readable document may use the QR code or URL to access the machine-readable document, thus achieving secured document sharing.

The software applications of downstream users may request access to the document in a format that returns not only text or styling but also the semantics and structures of the content (e.g., text) in the document. This allows the software application of a downstream user accessing a document to then do any relevant filtering, classification and ranking with more accuracy, in order to provide the document to the right audience. In one implementation, the online machine-readable document editor may generate the document in a data-interchange format such as the JSON format that is extensible to capture both text and other data (e.g., semantics).

FIG. 1 illustrates a system 100 for a machine-readable electronic document according to an implementation of the disclosure. System 100 may be a standalone computer system or a networked computing resource implemented in a computing cloud. Referring to FIG. 1, system 100 may include a processing device 102, a storage device 104, and an interface device 106, where the storage device 104 and the interface device 106 are communicatively coupled to processing device 102.

Processing device 102 may be a hardware processor such as a central processing unit (CPU), a graphic processing unit (GPU), or an accelerator circuit. Interface device 106 may be a display device such as a touch screen of a desktop, laptop, or smart phone. Storage device 104 may be a memory device, a hard disc, or a cloud storage device connected to processing device 102 through a network interface card (not shown in FIG. 1).

Processing device 102 may be a programmable device that may be programmed to implement a document editor 108 and an associated editor UI 110 presented on interface device 106. Editor UI 110 may allow a user, via an input device (e.g., a keyboard, a mouse, and/or a touch screen), to edit a document (e.g., a resume). In one implementation, the document may include a description of the qualifications of a job candidate including linguistic expressions representing one or more qualifications for performing a specific job. The one or more qualifications may include specific skills such as, for example, hardware skills or software programming skills. Accordingly, a user may use the document editor to write, edit, or review their resume.

In one implementation, processing device 102 may implement editor UI 110 including an additional feature referred to as the annotation suggestion prompt 112. In one implementation, annotation suggestion prompt 112 may be incorporated into editor UI 110 as an additional function and may be automatically activated in response to user input (e.g., in real time) or may be activated by a user to actively enter semantic information via annotation prompt 114. The annotation prompt 114 may be used to enter a custom semantic annotation by a user or it may be used to confirm the addition of a suggested annotation (e.g., from annotation suggestion prompt 112) presented on editor UI 110.

In another implementation, document editor 108 may run as a daemon program in the background to monitor user input, such as text (both currently being entered or previously entered), into the document. Document editor 108, when executed by processing device 102, may receive, via editor UI 110, user input for creating a machine-readable document (e.g., a resume) at 116. The document editor 108 may then analyze the resume (e.g., the user input) using a machine learning model (e.g., a neural network) at 118. The neural network may analyze the user input received via editor UI 110 to identify structure, semantics and context associated with the user input, for example, a semantic relation map (e.g., like map 300 of FIG. 3) may be used to find content (e.g., text or images) that is semantically related to the user input at 120. Responsive to determining the structure, semantics and context associated with the user input, document editor 110 may generate a machine-readable document including structure, semantics and context associated with the user input at 122.

The following sections describe document editor 108 in more detail. Document editor 108, when activated (e.g., by user input received via editor UI 110 at 116), may, at 118, analyze a resume presented in editor UI 110 using a machine learning model. The resume may include a job applicant's description for consideration by a hiring professional at an organization that needs to fill a job opening. The applicant's description may contain linguistic expressions representing the applicant's qualifications for the job opening. The qualifications may include aspects of the applicant's skillset that are related to the job (e.g., computer programing). The aspects may include a history of job titles, job skills, job responsibilities, and textual descriptions of different aspects of the jobs the applicant has performed in the past. An example resume may include a current job title of "Lead Frontend Engineer," job skills of "C++, Java, Python, Algorithm, SQL, Linux, Android," job responsibilities of "Develop frontend component platform," "Work closely with design to create pixel-perfect sites," and "Build delightful web user interfaces for our consumers," and other textual descriptions of different aspects of the current job. Accordingly, the resume may contain linguistic expressions pertaining to the different aspects of the applicant's current job. Furthermore, the linguistic expressions may be in any language such as English, German, or French. Still further, the linguistic expressions may be a word, a phrase, or a sentence containing one or more words associated with certain semantic meanings.

In one implementation, the machine-readable document may be a resume. A resume provider may host a resume bank that contains a large number of resumes submitted by job applicants. These resumes may include both textual and stylistic information. The downstream consumers for the resumes may be a human resource department of a potential employer, a headhunter, or a professional placement agency. Different downstream consumers of the resume may have different credentials (e.g., privilege levels) that allow them to access some of the resumes and/or different categories of information stored in the resumes (see description of FIG. 4 below).

Resumes are often parsed, filtered, classified and ranked by computer applications before they reach their intended downstream consumers, such as a prospective employer. Software applications, such as Applicant Tracking Systems (ATS), may perform the resume parsing before mapping a candidate to relevant jobs for which the resume may then be sent to a hiring manager/recruiter for those jobs.

An online machine-readable document editor 108 may be provided for users to create their resumes. The online machine-readable document editor 108 could allow users to build their resumes while providing ways for them to enter semantic and structural information along with styling (e.g., via annotation suggestion prompt 112 and annotation prompt 114). An exemplary editor UI 110 for the online machine-readable document editor 108 may present dialog boxes (e.g., prompts) for a user to enter personal information, a resume summary, a work history including current position, previous position, years at each position, languages, hobbies, and skills.

As noted above, in one implementation the machine-readable document editor 108 may provide functions for annotating the content (e.g., user inputted text) of a resume for structure, semantics and context of the content. For example, the editor UI 110 may help annotate information about the education of a resume creator. The machine-readable document editor 108 may allow information to be entered via the editor UI 110 in the form/structure of tables as in other typical document editing applications. The structure of the document (e.g., a resume) may refer to the hierarchical structure of the document. For example, a resume may include structural sections of, for example, personal information, work experience, skill, education background, awards, publications, etc. However, in addition, the machine-readable document editor 108 may understand the structure and semantics of the user input "Stanford University" so that it may link the user input with the relevant column heading (i.e., structure of the known editor UI 110) and a semantic classification or type of the information (e.g., a University) and may also identify semantically related content (e.g., a university logo) that may be suggested as an annotation to the resume.

The machine-readable document editor 108 may use a machine learning model that is a parameterized representation that may be used to determine the structure, semantics and context of the content of user input received via editor UI 110. The machine learning model may be a statistical model or a deep neural network (DNN).

FIG. 2 illustrates a machine learning model 200 according to an implementation of the disclosure. In one implementation, machine learning model 200 may be a DNN that may include multiple layers, in particular including an input layer for receiving data inputs, an output layer for generating outputs, and one or more hidden layers that each includes linear or non-linear computation elements (referred to as neurons) to perform the DNN computation propagated from the input layer to the output layer that may transform the data inputs to the outputs. Two adjacent layers may be connected by edges. Each of the edges may be associated with a parameter value (referred to as a synaptic weight value) that provide a scale factor to the output of a neuron in a prior layer as an input to one or more neurons in a subsequent layer.

Referring to FIG. 2, machine learning model 200 may include an input layer including an input 202 to receive a user input linguistic expression from a job applicant's online resume. The input layer may, responsive to receiving user input expression, retrieve associated data from a semantic database 208 and a resume pool 210 that may act as a training data set for the machine learning model 200. The semantic meaning of the user input linguistic expression may represent a job applicant's qualification in the resume. The machine learning model 200 may include an output layer including outputs 204A, 204B to produce a semantic similarity score and a contextual similarity score associated with user input received via the editor UI 110 which is represented by the expression received at input 202. As noted above, structure data for the user input expression may be inferred form the known structure of editor UI 110. In the example of FIG. 2, the semantic similarity score may represent a similarity (e.g., "closeness" as described below with respect to FIG. 3) between the user input expression and the associated data retrieved from semantic database 208 and the contextual similarity score may represent a predicted percentage of the resume pool 210 that shares the job applicant qualification represented by the user input expression (e.g., measures the applicant's qualification in the "context" of the pool of available candidates). Responsive to receiving the user input expression representing the job applicant's qualification (e.g., a job skill) at input 202, processing device 102 may execute machine learning model 200 to calculate a semantic similarity score at output 204A and a contextual similarity score at output 204B. The semantic similarity score for the data retrieved from semantic database 208 may be compared to a threshold value in order to determine if it will be included as semantic data in a machine-readable version of the resume or suggested to the job applicant as an annotation to the resume. The contextual similarity score may represent a classification that may be included as contextual data in the machine-readable resume based on a predicted percentage of job applicants in the resume pool 210 possessing the same or similar job qualification as the job applicant. For example, an educational level qualification may be classified as "top ten percent" based on the contextual similarity score meeting a threshold value. Machine learning model 200 as shown in FIG. 2 is an illustrative model that generates a semantic similarity score and a contextual similarity score for a user input linguistic expression. Implementations of the disclosure are not limited to resumes. For example, the machine-readable document may be any document that benefits from filtering, sorting, or ranking by computer applications before being presented to a human for consumption.

Machine learning in this disclosure refers to methods implemented on a hardware processing device that uses statistical techniques and/or artificial neural networks to give computer the ability to "learn" (i.e., progressively improve performance on a specific task) from data without being explicitly programmed. The machine learning may use a parameterized model (referred to as "machine learning model") that may be deployed using supervised learning/ semi-supervised learning, unsupervised learning, or reinforced learning methods. Supervised/semi-supervised learning methods may train the machine learning models using labeled training examples. To perform a task using supervised machine learning model, a computer may use examples (commonly referred to as "training data") to test the machine learning model and to adjust parameters of the machine learning model based on a performance measurement (e.g., the error rate). The process to adjust the parameters of the machine learning model (commonly referred to as "train the machine learning model") may generate a specific model that is to perform the practical task it is trained for. After training, the computer may receive new data inputs associated with the task and calculate, based on the trained machine learning model, an estimated output for the machine learning model that predicts an outcome for the task. Each training example may include input data and the corresponding desired output data, where the data can be in a suitable form such as a vector of numerical alphanumerical symbols.

The learning process may be an iterative process. The process may include a forward propagation process to calculate an output based on the machine learning model and the input data fed into the machine learning model, and then calculate a difference between the desired output data and the calculated output data. The process may further include a backpropagation process to adjust parameters of the machine learning model based on the calculated difference.

In one implementation, the training data may include applicant profiles (e.g., resumes) of job applicants known to belong to a similar class as the job applicant (e.g., similar current job title). These persons may be current employees or ex-employees of the organization. Alternatively, given an applicant profile for a person of unknown class (e.g., with respect to the current job title classification), the processing device may execute a class predictor application to predict which class a profile belongs to (e.g., using the candidate's previous jobs in the resume as features to predict the current job title via a pre-trained job title classifier including a one-layer neural network applying a probability threshold to the soft output of such classifier), and then the applicant profile and the predicted class may be used as a piece of training data. The applicant profiles (e.g., resume pool 210) may include expressions representing different job qualifications. The training process may extract an expression from an applicant profile in the training data, and place the expression into a bin associated with the corresponding class. The training process may repeat the same for each expression in the profiles of the training data, and place them in the corresponding bin. The training process may calculate the class participation rates for different expressions. For example, a bin A associated with a first job title may contain X items of an expression and a bin B associated with a second job title may contain Y items of the expression, with X and Y each then normalized by dividing each by the unique items of expressions in the associated bin, resulting in $X'$ and $Y'$. The first job title participation rate may be calculated as $X'/(X'+Y')$ and the second job title participation rate may be calculated as $Y'/(X'+Y')$.

In another implementation, the training process may construct parameterized machine learning model 200 to calculate the similarity scores based on a given job skill, alone or with other input features. Such other input features may be the hiring department, whether it is sales, engineering, finance, legal, human resource, or another department, the geographic region, and the language of the job profile. A decision tree may be trained based on training sets of existing job profiles (e.g., resume pool 208) with these features. A soft-output decision-tree classifier may be trained with the output being a soft likelihood value of similar versus different, input being a vector representation of the job skill along with other inputs providing additional context.

Referring to FIG. 1, at 120, responsive to analyzing the user input, document editor 108 may determine semantic data associated with the user input based on a comparison to a threshold value. When the semantic data that is retrieved from semantic database 208 meets or exceeds the threshold value the document editor 108 may select one or more of the retrieved data from semantic database 208 which are most semantically similar to the user input expression and include them in the semantic data provided with the machine-readable version of the resume or present them to the user as a possible annotation to the machine-readable version of the resume.

The semantic similarity between two expressions may be determined using a semantic relation map. A semantic relation map includes a network of expressions that are connected based on their meanings, where distance between two expressions may indicate the semantic similarity between the two expressions. The closer two expressions in the semantic relation map, the more similar the two expressions in meaning. In one implementation, a semantic relation map may be constructed for a particular domain of knowledge. For example, a semantic relation map may be constructed in the context of job qualifications relating to the computer science domain. The domain-specific semantic relation map may be constructed by training using domain-specific training data or by pruning a generic semantic relation map using domain knowledge.

Figure 3:
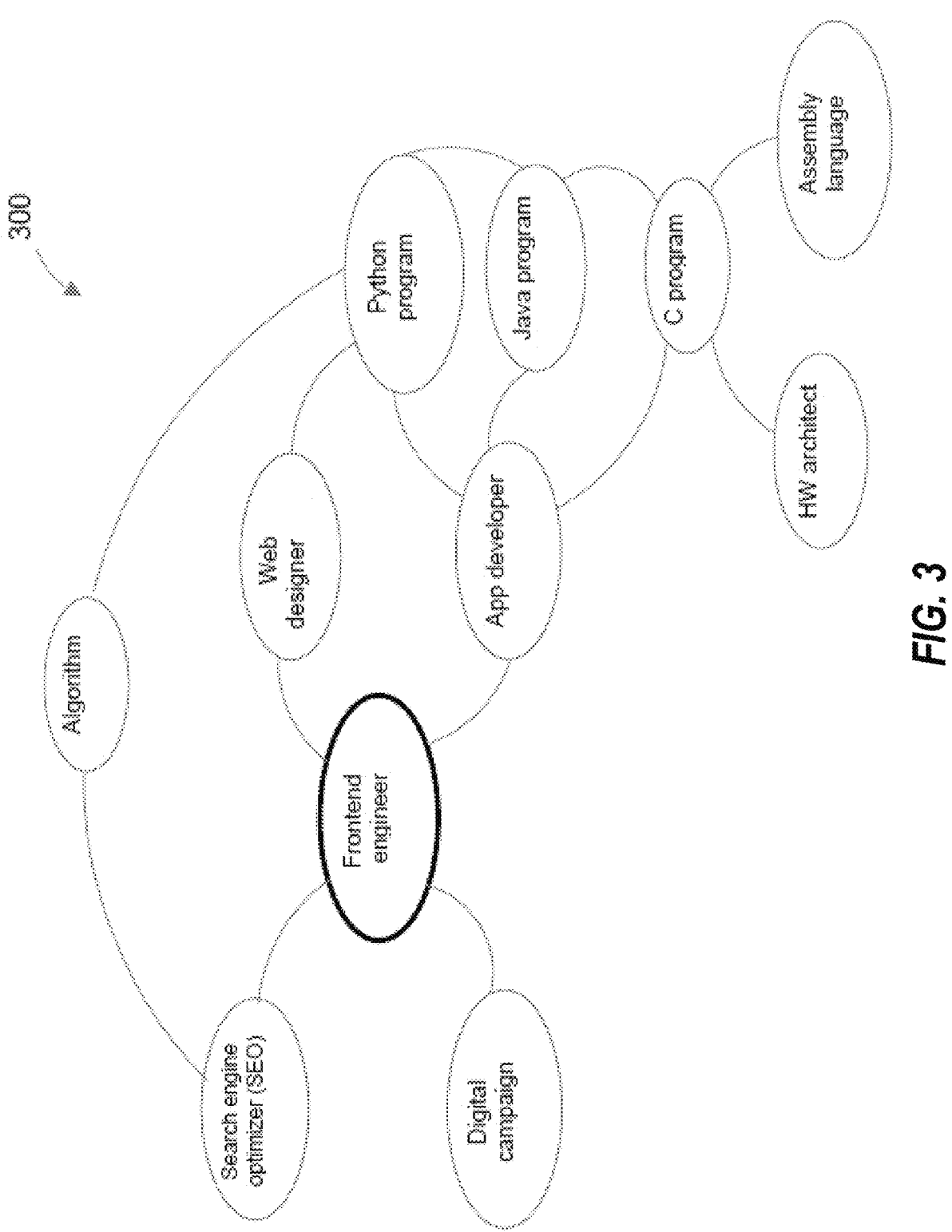
FIG. 3 illustrates an example semantic relation map for a job qualification domain associated with computer science.

FIG. 3 illustrates an example semantic relation map for a job qualification domain associated with computer science. The semantic relation map 300 is an illustrative example for the purpose of explanation. As shown in FIG. 3, semantic relation map 300 may include expressions ("Frontend engineer," "Search engine optimizer (SEO)," "Digital campaign," "Algorithm," "Web designer," "Application developer," "Python program," "Java program," "C program," "Hardware architect," and "Assemble language") that are connected by links. The semantic similarity between two expressions may be determined by the shortest path (e.g., measured in terms of number of links) between the two expressions. For example, "Frontend engineer" is more similar to "Application engineer" than "C program" because the shortest path between "Frontend engineer" and "Application engineer" is one link while the shortest path between "Frontend engineer" and "C program" includes two links. Thus, for each expression extracted from a resume, document editor 108 may determine a set of similar expressions defined as those whose semantic similarities are within a link threshold (e.g., two links) in the semantic relation map 300.

The semantic relation map 300 may also be built with soft distances instead of counting links. One way to construct the map is to vectorize representations of word strings in the job descriptions. For instance, an n-gram model can be built from words or phrases, n being a positive integer. The n-gram can be viewed as a type of probabilistic model for predicting the next item given the n−1 observations. With a 3-gram model, English letters are modelled in a 263-dimension vector space, ignoring upper and lower cases, space, and other special characters. For example, the string "Web designer" contains 3-grams such as "web," "des," "esi," "sig," and so on. Any string can be mapped to the vector space by vectorizing it into such n-grams. Two vectors representing two strings have a distance between them. One measure of matching similarity between the two vectors is called dot product or cosine similarity. Based on A being an M-dimension vector of components $A_i$, and B being another M-dimension vector of components $B_i$, where i takes on the values from 1 to M. The dot product of A and B is expressed as $A \cdot B/\|A\|*\|B\|$, where the · operator represents the dot product of two vectors, $\| \|$ operator represents the magnitude operator, and * is the scaler product operator. Given a carefully selected corpus of words for a particular contextual concept, a dictionary of n-grams may be built to represent the probabilistic occurrence of the n-grams. Words may be translated into a vectorized representation of the n-grams. A similarity between any pair of two words is the soft distance, which informs adjacent words or phrases for the context. Words that appear out of the dictionary may be ignored or handled as special cases. Other forms of word embedding than building explicit n-grams may also be used to vectorize words or phrases, including embedding through training neutral network hidden-layers.

Once words and phrases become measurable in semantic distances under a constructed semantic map, a user interface (e.g., editor UI 110) may be presented to a user that includes prompts for adjacent job skills (e.g., annotation suggestion prompt 112) that may be added as semantic annotations or even substituted for the original user input if the job applicant so desires. The prompting of such additions/alternatives gives valuable insight and freedom when creating a job applicant is creating a resume. In one implementation the document editor 108 may go through existing job descriptions to find user input expressions that are flagged to have highly-skewed class participation rates (e.g., they do not appear in any of the other resumes in the resume pool 210), the system may automatically suggest other expressions that are both adjacent in semantic meaning and have more balanced class participation rates.

In one implementation, document editor 108 may calculate a class participation rate (e.g., for applicants in resume pool 210) for each expression in the semantic relation map using the machine learning model 200 as described in conjunction with FIG. 2. Thus, document editor 108 may determine, based on the class participation rate, which similar expressions are more or less common for the class. These similar expressions are candidates for inclusion as semantic data in a machine-readable version of the resume as noted at 120. For example, document editor 108 may determine that "Frontend engineer" extracted from the resume is associated with a class participation rate of 38%, and thus a classification of "top half" may be added as contextual data to the machine-readable version of the job applicants resume. Document editor 108 may determine, based on the semantic relation map 300, that "Web designer," "Application developer," "Search engine optimizer (SEO)," and "Digital campaign" are similar to "Frontend engineer." Further, document editor 108 may determine that "Web designer," "Application developer," "Search engine optimizer (SEO)," and "Digital campaign" are associated with the following class participation rates of 45%, 55%, 70%, and 35%, respectively. According to the associated class participation rates, "Digital campaign," "Web designer," and "Application developer" are qualification requirements similar to "Frontend engineer" and may be suggested as semantic data or as a user annotation for the resume. Thus, "Web designer," "Application developer," and "Digital campaign" may also be potential replacements for "Frontend engineer" on the resume.

In one implementation, document editor 108 may present the second expressions (e.g., the identified "Digital campaign," "Web designer," or "Application developer") on interface device 106 as suggested replacements to the first expression (e.g., via annotation suggestion prompt 112) responsive to determining these expressions as similar to the user input expression describing the job qualification "Frontend engineer". Responsive to identifying the one or more similar expressions, document editor 108 may present a display instruction (e.g., on editor UI 110) causing the user input expression to be highlighted (e.g., red highlight) to notify the user that this linguistic expression may be supplemented and/or substituted by these similar expressions. Responsive to a further user interaction with the highlighted expressions (e.g., moving the mouse to the highlighted expressions), document editor 108 may present the suggested replacement expressions to the job applicant. In one implementation, document editor 108 may present the class participation rates associated with the one or more similar expressions, thus presenting quantified classification metrics for helping the job applicant make expression supplementation/replacement decisions.

The job applicant may confirm the addition of the similar expressions (or substitution of the user input by a similar expression) via annotation prompt 114 presented with editor UI 110 to confirm a particular addition/replacement expression selected from one of suggested replacements. Responsive to the user action selecting the replacement expression (e.g., confirm via annotation prompt 114), at 122, document editor 108 may use the selected addition/replacement expression to generate the machine-readable version of the resume document.

Figure 4:
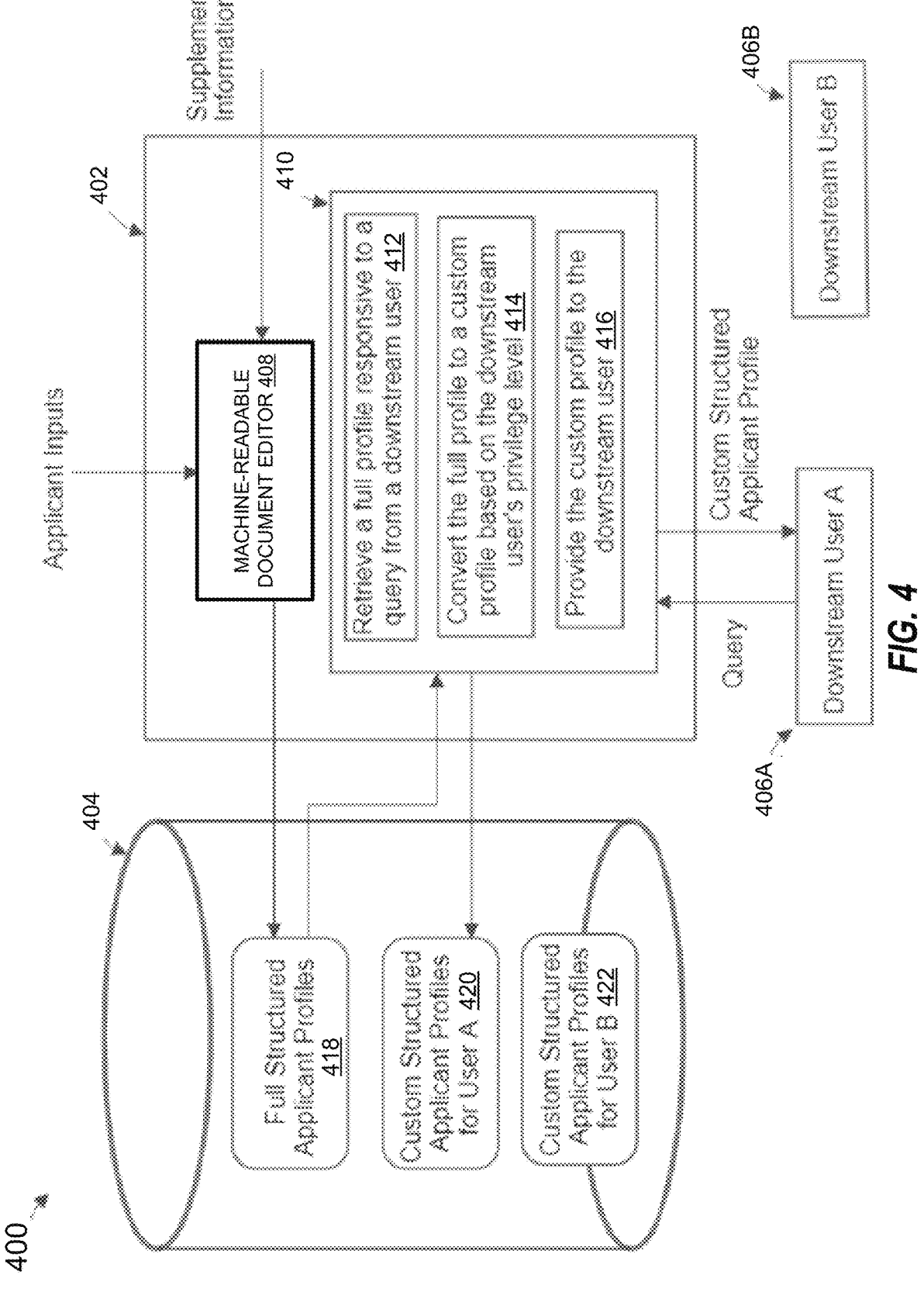
FIG. 4 illustrates a system for a machine-readable electronic document according to an implementation of the disclosure.

FIG. 4 illustrates a system for a machine-readable electronic document according to an implementation of the disclosure. The system 400 may generate and provide documents that retain information about the structure and semantics of their content for downstream consumers of the document. As shown in FIG. 4, system 400 may include a processor 402 and a storage 404 communicatively coupled to processor 402. System 400 may provide machine-readable resumes (e.g., structured applicant profiles) for downstream users 406A, 406B through a network (not shown). These downstream users 406A, 406B may be associated with different credentials (e.g., privilege levels) for accessing a full resume document or portions of a resume in a customized document.

Implementations of the disclosure may provide a resume store as a system of records for storing resumes (e.g., storage 404). A user may create an account and use an online resume builder (e.g., machine-readable document editor 408) to create the resume in a machine-readable format (e.g., JSON format), and set up permissions to allow different versions of the resume (e.g., custom versions) to be downloaded or viewed by different downstream consumers (e.g., hiring companies) that may each be associated with different privilege levels.

Each of the downstream consumers may make a request for resumes with a credential associated with the downstream consumer. The credential may represent a privilege level associated with a level of resume information (e.g., full or custom) available to the downstream consumer. The level of information may be associated with privacies (different levels of masking, redaction, and anonymization), access controls beyond security (rate limit), and version controls. For instance, when a downstream software application queries against a database of resumes using a QR code generated by the online resume editor, a software module responsive to the request may query the database for all versions of the resumes and alert the downstream application that a newer version of the resume is available in the database. An interactive exchange based on configurable rules may enable the downstream software application to download the latest version of the resume for its users.

The communication from and to a downstream user may be achieved via an Application Program Interface (API). The API includes a structure itself and enables a common protocol for downstream applications to use for querying the database of resumes preserved with structural and semantic information about their contents. The API may enable a variety of downstream usage cases with the configurability of permission and access-level control, privacy redaction, version alert and updating. The API may allow an application of a downstream user to retrieve a full version of the resume including any semantic or contextual structures added during the resume editing stage or it may restrict the user to a custom version of the resume which provides less of the semantic or contextual structures added to the resume. The API may be communicated online by a system provider that hosts the resume editor, and the system provider or third party companies may use the API to construct their intelligent downstream applications that may utilize the machine-readable resumes with full semantic and structure information preserved and downloaded through the API.

Processor 402 may support a machine-readable document editor 408 and application programming interface (API) 410. Machine-readable document editor 408 may include a graphic user interface (e.g., editor UI 110 of FIG. 1) and an underlying recorder for capturing a user's inputs. In one implementation, an applicant for a job may enter applicant inputs. The inputs may include substantive information in the form of text and also include structure and semantics information in the form of metadata labels at different levels (e.g., "basics," "profiles," "work," in a first level, and "name," "label," "picture" etc. in a second level). Additionally, the machine-readable document editor 408 may supplement the applicant inputs with additional information retrieved from a proprietary database (e.g., the company HR database) or a public database (e.g., the Internet) to generate a full structured applicant profile 418 (e.g., a resume that retains semantic and structural information about its contents), and store the full structured applicant profile 418 in storage 404. Storage 404 may contain a database of full structured applicant profiles 418 created by applicants. The applicants may also impose access limitations on the full structured applicant profiles 418. For example, the applicants may allow a certain type of employer (e.g., high tech companies, non-profit organizations, etc.) to access their resumes. Additionally, system 400 may also impose access limitations based on rules. These access rules may be based on privacy requirements or subscription levels (limited membership, full membership, premier membership depending on the paid member fees etc.). Each downstream consumer of the resume (e.g., downstream users 406A, 406B) may be associated with a credential that may provide the downstream user with a certain level (e.g., privilege level) of access to the store of full structured applicant profiles. The limitations may pertain to certain resumes or to certain parts of the resumes.

API 410 may control the access of full structured applicant profiles 418 by downstream users 406A, 406B. A downstream user 406A may make a query (or request) to API 410 for resumes. The query may include the credential of downstream user 406A indicating the level of access granted to downstream user A. Responsive to receiving the query, processing device 402 may execute API 410 and retrieve one or more full structured applicant profiles 418 based on the query at 412, convert the one or more full structured applicant profiles 418 into one or more custom structured applicant profiles 420 and 422 based on the downstream user's credentials at 414, and provide the custom profiles to the downstream user at 416. The conversion may include removal, masking, redaction, and/or anonymization of part of the one or more full structured applicant profiles 418. The one or more custom profiles may still be in the structured format (e.g., retain semantic, contextual and structural information) except that a custom structured applicant profile 420 or 422 may contain only a part of semantic, contextual or structural information of a full structured applicant profile 418. In one implementation, API 410 may also store the custom structured applicant profiles 420 and 422 in storage 404 so that they may be provided for downstream users 406A, 406B responsive to future requests.

FIG. 5 illustrates a flowchart of a method 500 for a machine-readable electronic document according to an implementation of the disclosure. Method 500 may be performed by processing devices that may comprise hardware (e.g., circuitry, dedicated logic), computer readable instructions (e.g., run on a general purpose computer system or a dedicated machine), or a combination of both. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a processing device 102 executing document editor 108 as shown in FIG. 1.

As shown in FIG. 5, processing device 102 may, at 502, receive, via a user interface (e.g., editor UI 110), user input (e.g., a linguistic expression) towards creating the machine-readable electronic document.

At 504, processing device 102 may use a neural network to analyze the user input (e.g., machine learning model 200)

to generate the machine-readable electronic document, wherein analyzing the user input comprises steps 506-510.

At 506, determining from the user input, first data associated with a structure (e.g., tables, columns, prompts of editor UI 110 used to receive the user input) of the machine-readable electronic document.

At 508, determining from the user input, second data associated with semantics (expressions that have a similar meaning to the user input) of the machine-readable electronic document; and At 510, determining from the user input, third data associated with a context (classification of the user input in the context of other job applicant in a resume pool 210) of the machine-readable electronic document.

At 512, processing device 102 may generate the machine-readable electronic document based on the first data, the second data and the third data (e.g., a machine-readable resume that retains structural, semantic and context data about the content of the resume including the user input).

Figure 6:
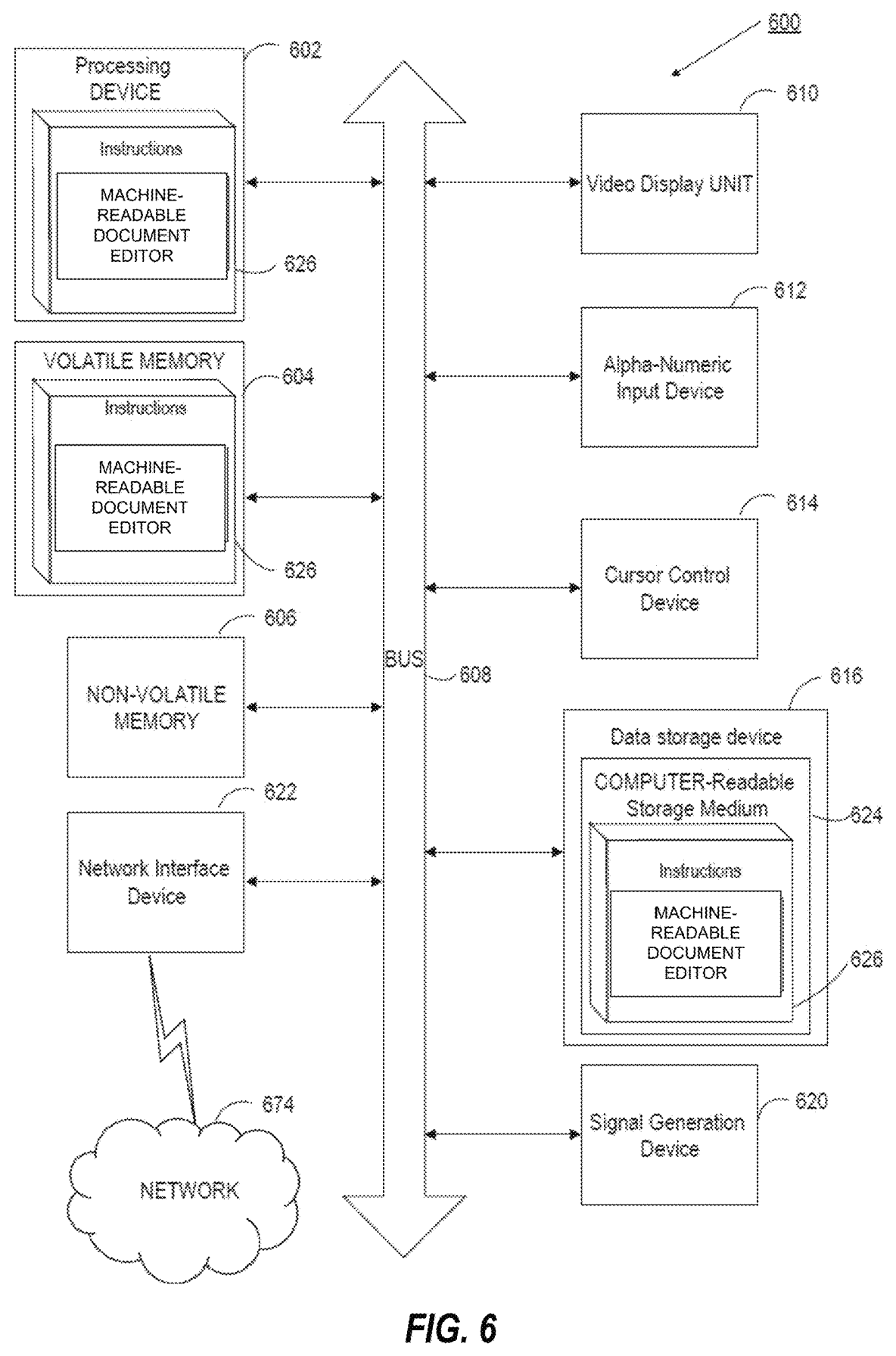

FIG. 6 depicts a block diagram of a computer system 600 operating in accordance with one or more aspects of the present disclosure. In various illustrative examples, computer system 600 may correspond to the processing device 102 of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions of the document editor 108 of FIG. 1 for implementing method 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A computing system for converting a first document including formatting cues designed for a human reader to a machine-readable electronic document, the computing system comprising:

one or more processors, communicatively connected to a memory device, to:

receive, via a user interface (UI), user input to the first document towards creating the machine-readable electronic document;

execute a neural network to analyze the user input to generate the machine-readable electronic document, wherein the neural network is trained using training dataset by iteratively adjusting at least one parameter of the neural network during training, wherein the neural network comprises an input layer, at least one mid layer, and an output layer, and wherein to analyze the user input, the one or more processors are further to:

determine, from the user input, first data representing a structure of the machine-readable electronic document;

determine, from the user input, second data representing semantics of the machine-readable electronic document; and determine, from the user input, third data representing a context of the machine-readable electronic document;

label the first data, the second data, and the third data using metadata and store the metadata in a metadata file associated with machine-readable electronic document, wherein the machine-readable electronic document is in a data-interchange format;

responsive to determining the second data representing semantics, calculate, using a semantic relation map that includes a network of expressions being connected based on their meanings, semantic similarity scores measuring similarity between the second data and each of a plurality of linguistic expressions stored in a semantic database and compare the semantic similarity scores with a threshold to determine a set of linguistic expressions that are similar to the second data;

determine a class for the machine-readable electronic document based on a feature associated with the machine-readable electronic document;

calculate a corresponding class participation rate for each one in the set of linguistic expressions in the class;

determine an annotation for the machine-readable electronic document based on the class participation rates, the annotation including suggested replacement expressions as an addition to the machine-readable electronic document to a user, wherein the suggested replacement expressions are selected from the set of linguistic expressions and are associated with corresponding class participation rates within a range of the class participation rate associated with the second data;

responsive to identifying the annotation, present the annotation on the UI, wherein the annotation includes at least one of text data, audio data, and image data to be stored in a machine-readable format; and responsive to identifying a user selection of a first replacement expression on the UI, add the first replacement expression to the machine-readable electronic document;

generate the machine-readable electronic document based on the first data, the second data, and the third data and provide the machine-readable electronic document and the associated metadata file in the data-interchange format to a downstream software application for filtering, classification and ranking;

receive a request from the downstream software application for the machine-readable electronic document, wherein the request comprises a profile including a privilege level associated with a user;

generate, based on the privilege level associated with the user, a version of the machine-readable electronic document, wherein the version of the machine-readable electronic document is one of a complete version of the machine-readable electronic document or a customized version of the machine-readable electronic document; and provide the determined version of the machine-readable document to the downstream software application.

2. The computing system of claim 1, wherein the first data includes data associated with a hierarchical structure of the machine-readable electronic document constructed based on a hierarchy of prompts in the UI for receiving the user input.

3. The computing system of claim 1, wherein the second data includes semantic data associated with a meaning of the user input retrieved from a remote server based on a cross-reference of the user input with a semantics database.

4. The computing system of claim 1, wherein the third data includes data associated with at least one classification of the user input based on a comparison of the user input to a training set of associated machine-readable electronic documents.

5. The computing system of claim 1, wherein the one or more processors are further to: provide an application programming interface (API) for accessing the machine-readable electronic document by software applications.

6. The computing system of claim 5, wherein the API includes at least one of a uniform resource locator (URL) and a linked quick response code (QR) code for accessing the machine-readable electronic document by a software application.

7. The computing system of claim 1, wherein the one or more processors are further to:

receive a request by a user;

determine, based on a user profile, a privilege level associated with the user;

determine, based on the privilege level associated with the user, a version of the machine-readable electronic document, wherein the version of the machine-readable electronic document is one of a complete version of the machine-readable electronic document or a customized version of the machine-readable electronic document; and provide the determined version of the machine-readable document to the user.

8. The computing system of claim 7, wherein the customized version of the machine-readable electronic document provides less of, at least one of, the first, second, or third data to the user than the complete version of the machine-readable document.

9. A method for converting a first document including formatting cues designed for a human reader to a machine-readable electronic document, the method comprising:

receiving by one or more processors, via a user interface (UI), user input to the first document towards creating the machine-readable electronic document;

executing a neural network to analyze the user input to generate the machine-readable electronic document, wherein the neural network is trained using training dataset by iteratively adjusting at least one parameter of the neural network during training, wherein the neural network comprises an input layer, at least one mid layer, and an output layer, and wherein the analyzing includes the one or more processors:

determining, from the user input, first data representing a structure of the machine-readable electronic document;

determining, from the user input, second data representing semantics of the machine-readable electronic document; and determining, from the user input, third data representing a context of the machine-readable electronic document;

labeling the first data, the second data, and the third data using metadata and storing the metadata in a metadata file associated with machine-readable electronic document, wherein the machine-readable electronic document is in a data-interchange format;

responsive to determining the second data representing semantics, calculating, using a semantic relation map that includes a network of expressions being connected based on their meanings, semantic similarity scores measuring similarity between the second data and each of a plurality of linguistic expressions stored in a semantic database and comparing the semantic similarity scores with a threshold to determine a set of linguistic expressions that are similar to the second data;

determining a class for the machine-readable electronic document based on a feature associated with the machine-readable electronic document;

calculating a corresponding class participation rate for each one in the set of linguistic expressions in the class;

determining an annotation for the machine-readable electronic document based on the class participation rates, the annotation including suggested replacement expressions as an addition to the machine-readable electronic document to a user, wherein the suggested replacement expressions are selected from the set of linguistic expressions and are associated with corresponding class participation rates within a range of the class participation rate associated with the second data;

responsive to identifying the annotation, presenting the annotation on the UI, wherein the annotation includes at least one of text data, audio data, and image data to be stored in a machine-readable format; and responsive to identifying a user selection of a first replacement expression on the UI, adding the first replacement expression to the machine-readable electronic document;

generating the machine-readable electronic document, by the one or more processors, based on the first data, the second data, and the third data and providing the machine-readable electronic document and the associated metadata file in the data-interchange format to a downstream software application for filtering, classification and ranking;

receiving a request from the downstream software application for the machine-readable electronic document, wherein the request comprises a profile including a privilege level associated with a user;

generating, based on the privilege level associated with the user, a version of the machine-readable electronic document, wherein the version of the machine-readable electronic document is one of a complete version of the machine-readable electronic document or a customized version of the machine-readable electronic document; and providing the determined version of the machine-readable document to the downstream software application.

10. The method of claim 9, wherein the first data includes data associated with a hierarchical structure of the machine-readable electronic document constructed based on a hierarchy of prompts in the UI for receiving the user input.

11. The method of claim 9, wherein the second data includes semantic data associated with a meaning of the user input retrieved from a remote server based on a cross-reference of the user input with a semantics database.

12. The method of claim 9, wherein the third data includes data associated with at least one classification of the user input based on a comparison of the user input with a training set of associated machine-readable electronic documents.

13. The method of claim 9, wherein the one or more processors are further to: provide an application programming interface (API) for accessing the machine-readable electronic document by software applications.

14. The method of claim 9, further comprising the one or more processors:

receiving a request by a user;

determining, based on a user profile, a privilege level associated with the user;

determining, based on the privilege level associated with the user, a version of the machine-readable electronic document, wherein the version of the machine-readable electronic document is one of a complete version of the machine-readable electronic document or a customized version of the machine-readable electronic document; and providing the determined version of the machine-readable document to the user.

15. The method of claim 14, wherein the customized version of the machine-readable electronic document provides less of, at least one of, the first, second, or third data to the user than the complete version of the machine-readable document.

16. A machine-readable non-transitory storage media encoded with instructions that, when executed by one or more processing devices, cause the one or more processing devices to perform operations for converting a first document including formatting cues designed for a human reader to a machine-readable electronic document, the one or more processing devices to:

receive, via a user interface (UI), user input to the first document towards creating the machine-readable electronic document;

execute a neural network to analyze the user input to generate the machine-readable electronic document, wherein the neural network is trained using training dataset by iteratively adjusting at least one parameter of the neural network during training, wherein the neural network comprises an input layer, at least one mid layer, and an output layer, and wherein to analyze the user input, the one or more processors are further to:

determine, from the user input, first data representing a structure of the machine-readable electronic document;

determine, from the user input, second data representing semantics of the machine-readable electronic document; and determine, from the user input, third data representing a context of the machine-readable electronic document;

label the first data, the second data, and the third data using metadata and store the metadata in a metadata file associated with machine-readable electronic document, wherein the machine-readable electronic document is in a data-interchange format;

responsive to determining the second data representing semantics, calculate, using a semantic relation map that includes a network of expressions being connected based on their meanings, semantic similarity scores measuring similarity between the second data and each of a plurality of linguistic expressions stored in a semantic database and compare the semantic similarity scores with a threshold to determine a set of linguistic expressions that are similar to the second data;

determine a class for the machine-readable electronic document based on a feature associated with the machine-readable electronic document;

calculate a corresponding class participation rate for each one in the set of linguistic expressions in the class;

determine an annotation for the machine-readable electronic document based on the class participation rates, the annotation including suggested replacement expressions as an addition to the machine-readable electronic document to a user, wherein the suggested replacement expressions are selected from the set of linguistic expressions and are associated with corresponding class participation rates within a range of the class participation rate associated with the second data;

responsive to identifying the annotation, present the annotation on the UI, wherein the annotation includes at least one of text data, audio data, and image data to be stored in a machine-readable format; and responsive to identifying a user selection of a first replacement expression on the UI, add the first replacement expression to the machine-readable electronic document; and generate the machine-readable electronic document based on the first data, the second data, and the third data and provide the machine-readable electronic document and the associated metadata file in the data-interchange format to a downstream software application for filtering, classification and ranking;

receiving a request from the downstream software application for the machine-readable electronic document, wherein the request comprises a profile including a privilege level associated with a user;

generate, based on the privilege level associated with the user, a version of the machine-readable electronic document, wherein the version of the machine-readable electronic document is one of a complete version of the machine-readable electronic document or a customized version of the machine-readable electronic document; and provide the determined version of the machine-readable document to the downstream software application.

17. The computing system of claim 1, wherein the data-interchange format is JavaScript Object Notation (JSON).

* * * * *